(12) United States Patent
Araki et al.

(10) Patent No.: US 7,416,063 B2
(45) Date of Patent: Aug. 26, 2008

(54) ONE-WAY DAMPER AND ELECTRONIC DEVICES USING THE ONE-WAY DAMPER

(75) Inventors: Minoru Araki, Yokohama (JP); Masami Tanaka, Sagamihara (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 215 days.

(21) Appl. No.: 11/196,252

(22) Filed: Aug. 4, 2005

(65) Prior Publication Data

US 2006/0027432 A1    Feb. 9, 2006

(30) Foreign Application Priority Data

Aug. 5, 2004   (JP) .............................. 2004-228998

(51) Int. Cl.
 *F16D 57/02*   (2006.01)
 *F16F 9/14*    (2006.01)
 *E05F 3/20*    (2006.01)

(52) U.S. Cl. ........................ 188/296; 188/290; 188/307; 16/54

(58) Field of Classification Search ................. 188/290, 188/293, 296, 306, 307; 16/54, 82, 85
See application file for complete search history.

(56) References Cited

U.S. PATENT DOCUMENTS 5,255,396 A * 10/1993 Miyahara et al. ............. 4/246.2
5,697,122 A * 12/1997 Okabe et al. ................. 188/293
6,173,822 B1 * 1/2001 Korb et al. ................... 188/293
6,264,264 B1   7/2001 Kato et al. ................ 296/97.12
6,412,514 B1 * 7/2002 Raftis ..................... 137/512.15
6,725,984 B2 * 4/2004 Orita .......................... 188/290
7,107,084 B2 * 9/2006 Duarte et al. ............. 455/575.3
7,111,712 B2 * 9/2006 Orita .......................... 188/296
2002/0179387 A1  12/2002 Orita .......................... 188/290
2003/0150678 A1   8/2003 Iwashita ..................... 188/296
2003/0155196 A1   8/2003 Nishiyama ................. 188/290

FOREIGN PATENT DOCUMENTS

JP       05-052228       3/1993
JP       07-301272       11/1995
JP       09190906 A  *   7/1997

* cited by examiner

*Primary Examiner*—Thomas J Williams
(74) *Attorney, Agent, or Firm*—Manabu Kanesaka

(57) ABSTRACT

A one-way damper includes a cylindrical housing, a viscous fluid contained within the housing, a rotor rotatably disposed in the housing, and a valve body. The rotor has a center part for forming a rotational center, and a control wall extending radially outwardly from the center part for dividing an inside of the housing. The control wall has a distribution path. The valve body has a holding part for holding the center part, and a free edge part extending from one side of the holding part for opening-and closing the distribution path. A seal member prevents the viscous fluid from leaking between the housing and the rotor.

11 Claims, 6 Drawing Sheets

ONE-WAY DAMPER AND ELECTRONIC DEVICES USING THE ONE-WAY DAMPER

BACKGROUND OF THE INVENTION AND RELATED ART STATEMENT

The present invention relates to a one-way damper, and in particular to a one-way damper that controls the rotation of a body in one direction, and electronic devices using this one-way damper.

A conventional one-way damper includes a cylinder shaped housing, viscous fluid within this housing, a center part which is a center of the rotation, a rotor which divides the inside of the housing by standing to the diameter direction from this center part and which has a control wall which forms a connecting path with respect to the housing, and in which the center part and the control wall are rotatably housed in the housing. The conventional one-way damper also includes a control valve, in which one side near the control wall is the rotation center, and the other side contacts the inner surface of the housing, and rotates with the rotor, and a seal member which prevents viscous fluid from leaking between the housing and the rotor is suggested (see Patent Document 1).

Patent Document 1: Japanese Patent No. 2882109

In the conventional one-way damper, the space between the housing, the rotor and the control valve forms an orifice. Because a rotation point of the control valve is free, the orifice at the time of operation is large. Accordingly, large damping torque cannot be obtained in a conventional one-way damper.

In view of the problems described above, an object of the present invention is to provide a one-way damper that can achieve a large damping torque and maintain a certain accuracy of the damping torque, and an electronic device that uses this one-way damper.

Further objects and advantages of the invention will be apparent from the following description of the invention.

SUMMARY OF THE INVENTION

In order to attain the objects described above, according to a first aspect of the present invention, a one-way damper includes: a cylinder shaped housing, viscous fluid within this housing, a center part which is a center of the rotation, a rotor dividing the inside of the housing and having a control wall forming a distribution path within the housing, and where the center part and the control wall are rotatably housed in the housing. The one-way damper also includes: a holding part for holding the center part, a valve body extending from one side of this holding part and having a free edge part which opens and closes the distribution path, and a seal member for preventing viscous fluid from leaking between the housing and the rotor.

In the one-way damper of the present invention, the rotor is made of a synthetic resin having elasticity, and the valve body is positioned in a groove. Also in the one-way damper, a cross-section of the distribution path gradually becomes narrow towards a side of the valve body, and a rotation restriction part restricting rotation of the rotor is provided in the housing. Furthermore, the rotor is made of a glass-mixed synthetic resin, and the valve body is made of polyester.

According to a second aspect of the present invention, a system includes: an electronic device, where an inputting part is attached with respect to a main body of the electronic device. The electronic device uses the one-way damper of the present invention, where the one-way damper controls the inputting part when moved from the standing position.

According to a third aspect of the present invention, a system includes an electronic device having a monitor part attached to a main body of the electronic device. The electronic device uses the one-way damper of the present invention, where the one-way damper controls the fall of the monitor part onto the main body.

According to a fourth aspect of the present invention, a system includes an electronic device having a detachable inputting part that can be forced out of a main body of the electronic device by a forcing member. The electronic device uses the one-way damper of the present invention, where the rotor restricts the inputting part when pushed by the forcing member.

In the first aspect of the invention, a distribution path is provided on the standing part of the rotor. Since this distribution path is structured so as to open and close at the free edge part, the space between the housing and the rotor, which functions as an orifice, becomes narrow. Therefore, a large damping torque can be obtained and a certain accuracy of the damping torque can be maintained.

Because the rotor is made of a synthetic resin, which has elasticity, even when the damping torque of the viscous fluid is unevenly functioned to the rotor, the damping torque can be absorbed by the rotor's elasticity. Therefore, damage and breakage of the rotor are prevented.

Moreover, because a groove for disposing the valve body within is provided, the movement to the axis direction of the valve body can be restricted. Also, when the thickness of the groove is same as the thickness of the valve body, thickness of the viscous fluid becomes even. Therefore, the damping torque does not fluctuate and can be regulated.

Furthermore, because the cross-section of the distribution path becomes narrow towards the valve body side, the damping torque can also be functioned for the rotation of the rotor for the non-damping direction.

Moreover, because the rotation restriction part which restricts the rotation of the rotor is provided, it can be a one-way damper of 1 rotation.

Furthermore, because the rotor is made of glass contained synthetic resin, and the valve body is made of polyester, the rotor with high load can be strengthened. Therefore, damage and breakage of the rotor can be prevented.

According to the second aspect of the invention, falling of the inputting part from standing position, falling of the monitor part on the main body and jumping out of the inputting part from the main body by force of the forcing member can be controlled by the one-way damper. Therefore the damage and breakage of the inputting part and the monitor part can be prevented.

BRIEF DESCRIPTION OF THE DRAWINGS

FIG. 13 shows an operation of the one-way damper of according to an embodiment of the present invention;

DETAILED DESCRIPTION OF PREFERRED EMBODIMENTS

Hereunder, embodiments of the present invention will be explained in detail with reference to the accompanying drawings.

Figure 1:
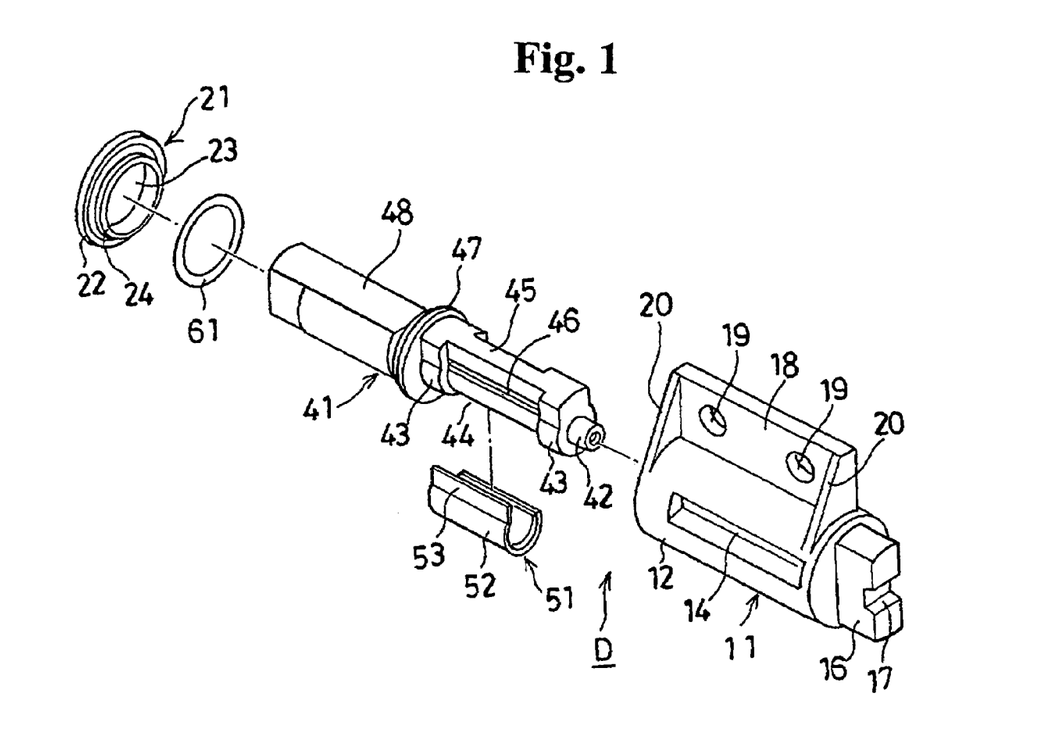
FIG. 1 is an exploded perspective view showing a one-way damper according to an embodiment of the present invention.

FIG. 1 shows a one-way damper in a disassembled state according-to an embodiment of the present invention. The one-way damper is made of a rigid material, such as a synthetic resin. For example, the case 11 is made of polycarbonate, which is a synthetic resin having rigidity. Cap 21, which seals the opening end of the case 11, is also made-of polycarbonate. Silicone oil (not shown in figures), which is a viscous fluid, is housed in the case 11, which is sealed by the cap 21. FIG. 1 also shows, a synthetic resin rotatably housed in the case 11 and which has operation axis part 48, which extends through a hole 23 of the cap 21 to outside. A rotor 41 is made of a synthetic resin, such as polyester, and a valve 51, also made of polyester, is attached to the rotor 41. O-ring 61, which is made of a self-lubricated silicone rubber, serves as a seal member to prevent silicone oil from leaking between the cap 21 and the rotor 41.

Incidentally, the housing is formed by the case 11 and the cap 21.

Figure 2:
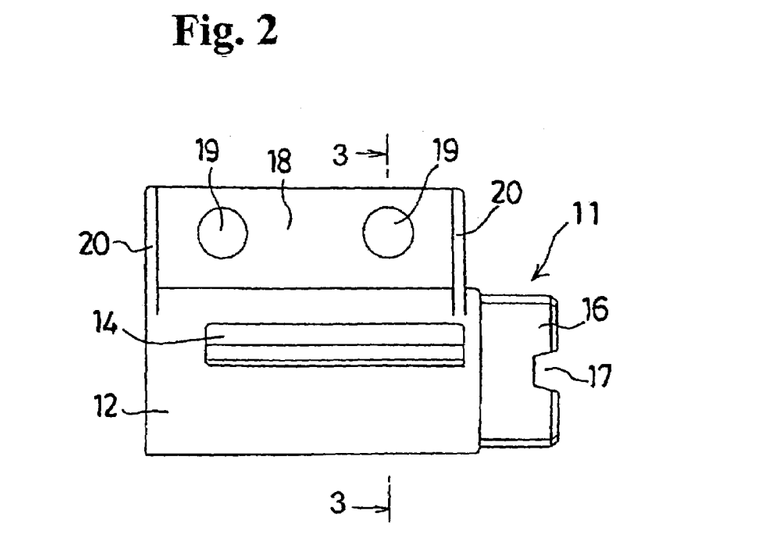
FIG. 2 is a front view showing a case of the one-way damper shown in FIG. 1 according to an embodiment of the present invention.
Figure 3:
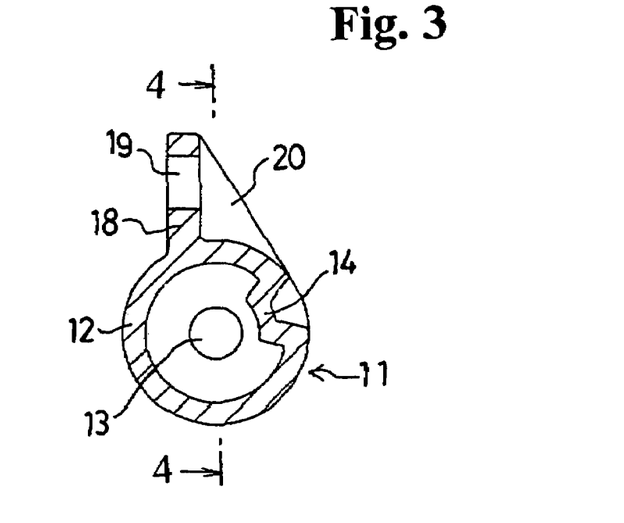
FIG. 3 is a cross-sectional view taken along line 3-3 of FIG. 2 showing the case of the one-way damper.
Figure 4:
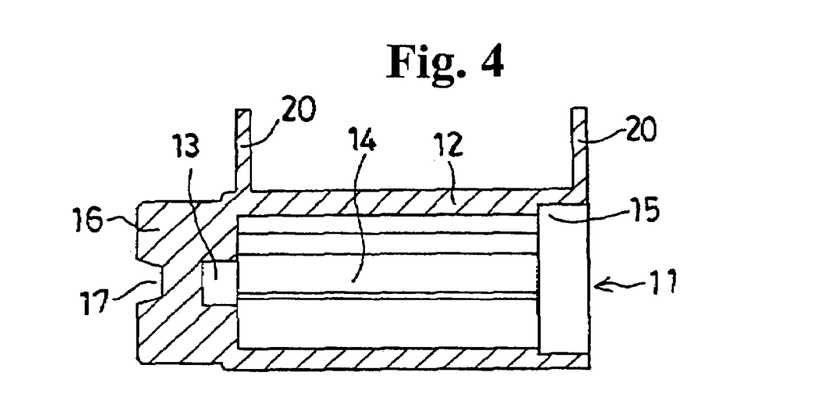
FIG. 4 is a cross-sectional view taken along line 4-4 in FIG. 3 showing the case of the one-way damper.

FIG. 2 is a frontal view of the case 11. FIG. 3 is a cross-sectional view of line 3-3 of FIG. 2. FIG. 4 is a cross-sectional view of the case 11, which is same as line 4-4 of FIG. 3.

In these drawings, the case 11 includes a case main body 12, which is cylinder shaped and has a bottom, a first attachment part 16 on the outer peripheral of the case main body 12 to the axis direction, and a second attachment part 18 that is reinforced at both ends by a rib 20. The case main body 12 also includes an axis supporting part 13 having a cylinder shaped concave part on the inside of the bottom on the axis direction of the outer peripheral, a rotation restriction part 14 having a protrusion part protruding inwardly in an arc shape, and on the inside of the opening edge, a level part 15 surrounding the rotation restriction part 14.

Moreover, a notch 17 is provided on the first attachment part 16, and an attachment hole 19 is provided on the second attachment part 18.

Moreover, on a rotation restriction part 14, an inner peripheral contacts on the outer peripheral of the center part 43 which structures the rotor 41 and the outer peripheral of the holding part 52 which structures the valve part 51, and the opposite side of the bottom of the case main body 12 is contacted with the flange part 47.

As shown in FIG. 1, the cap 21 is uniformly provided so as to surround the circumference of the loop-shaped sealing part 22, which has a through hole 23. The cap 21 also includes a loop-shaped protrusion part 24,which is inserted in the level part 15 of the case 11.

Figure 5:
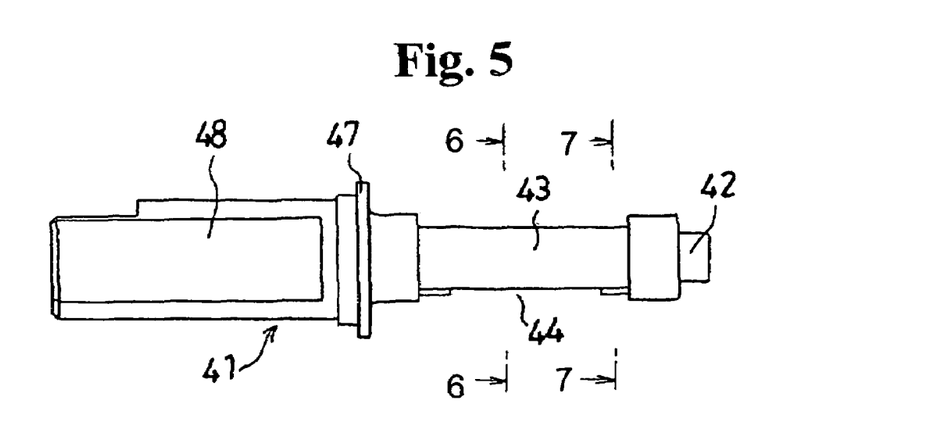
FIG. 5 is a front view of a rotor of the one-way damper shown in FIG. 1.
Figure 6:
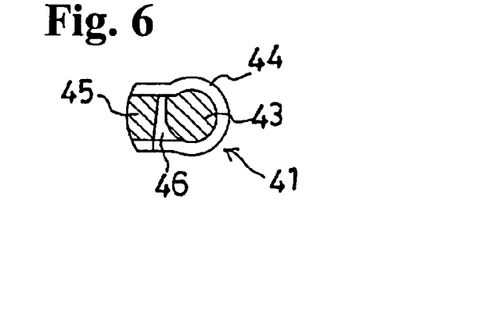
FIG. 6 is a cross-sectional view taken along line 6-6 in FIG. 5.
Figure 7:
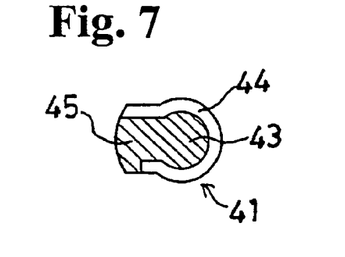
FIG. 7 is a cross-sectional view taken along line 7-7 in FIG. 5.

FIG. 5 is a frontal view of the rotor 41. FIG. 6 is a cross-sectional view of line 6-6 of FIG. 5. FIG. 7 is a cross-sectional view of line 7-7 of FIG. 5.

In these drawings, the rotor 41 includes a cylinder shaped supporting axis 42, which is rotatably inserted in the axis supporting part 13 of the case 11, a center part 43 which is concentrically connected to an edge of the supporting axis 42, a standing part 45, which is connected so as to stand to the radius direction from this center part 43, contacts the inner peripheral of the case main body 12 and divides inside of the case main body 12 into two, a flange part 47 concentrically connected to the side opposite to the supporting axis 42 of the center part 43, and rotatably inserted in the level part 15 of the case main body 12, and an I-cut shaped operation axis part 48,concentrically connected to the side opposite to the center part 43 of this flange 47 and extends through the cap 21.

Moreover, the center part 43 and the standing part 45 include a groove 44 which extends to the axis direction which reaches to the other side of the standing part 45 from one side edge of the standing part 45 via the outer peripheral of the center part 43. The depth of the groove 44 is the depth of the outer peripheral of the center part 43. The outer peripheral of the carrying part 52 becomes level with the groove 44 when the carrying part 52 of the valve 51 is attached on the groove 44. When the valve body 51 is placed on the groove 44 on the standing part 45, the cross-section of the distribution path 46 gradually becomes narrow towards the free edge part 53 of the valve 51.

As shown in FIG. 1, the valve body 51 includes a carrying part 52 that holds the center part 43. The carrying part 52 is arc shaped and is attached to the groove 44 of the center part 43. The free edge part 53 extends from an edge of the carrying part 52 to the radius direction, and is positioned on the groove 44 of the standing part 45, and closes and opens the distribution path 46.

Figure 8:
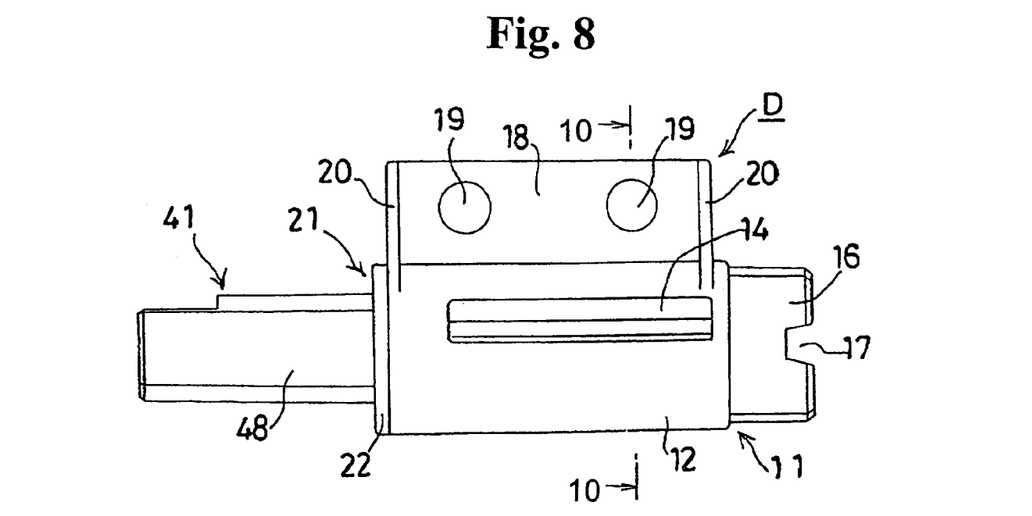
FIG. 8 is a front view showing the one-way damper in an assembled state according to an embodiment of the present invention.
Figure 9:
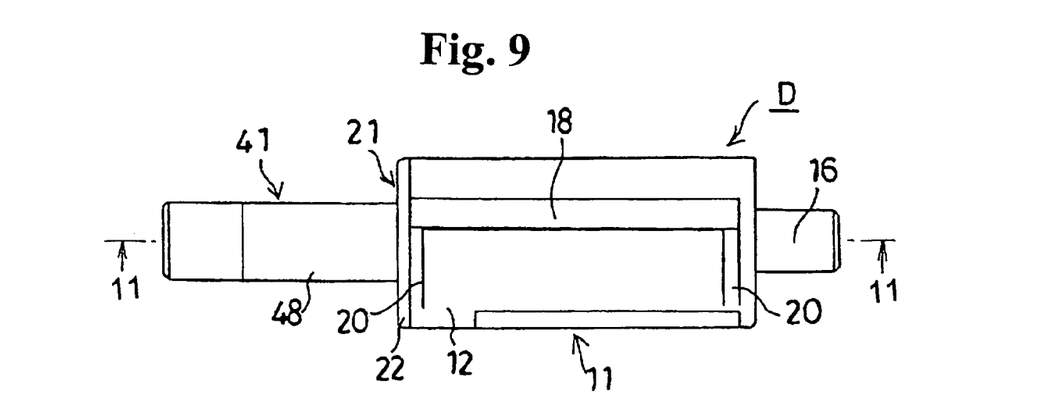
FIG. 9 is a plan view showing the one-way damper shown in FIG. 8.

FIG. 8 shows a frontal view of the one-way damper wherein each of the parts shown in FIG. 1 is assembled together. FIG. 9 shows a plan view of the one-way damper, and FIG. 10 shows a cross-sectional view of line 9-9 of FIG. 8, and FIG. 11 is a cross-sectional view of line 11-11 of FIG. 9.

Figure 10:
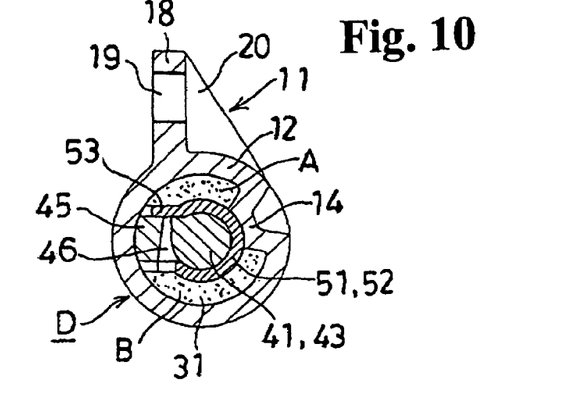
FIG. 10 is a cross-sectional view taken along line 10-10 in FIG. 8.
Figure 11:
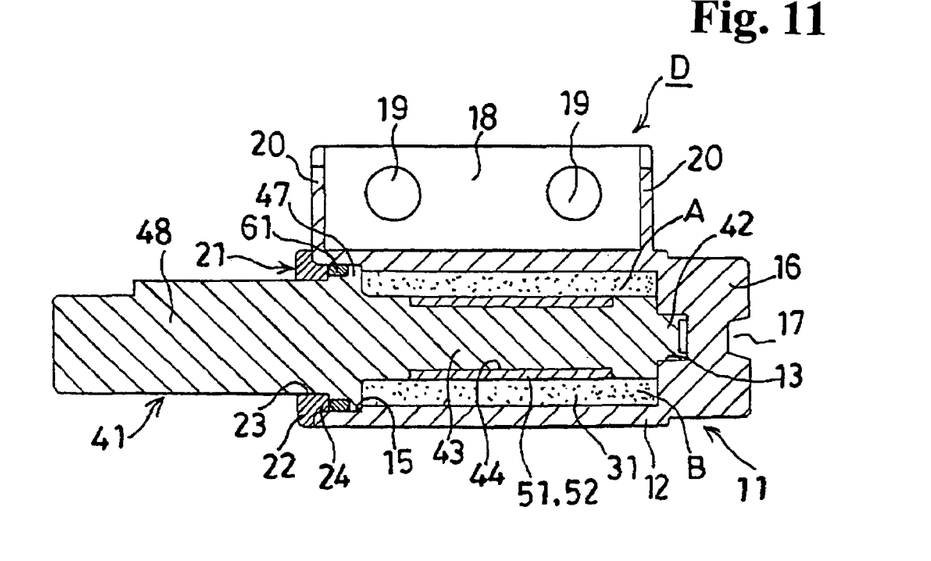
FIG. 11 is a cross-sectional view taken along line 11-11 in FIG. 9.

With further reference to FIGS. 10 and 11, a viscous fluid 31, such as silicone oil, is shown, and A and B depict a division formed by dividing the housing into two.

Next, one example of the assembly of the one-way damper D is explained.

First, the case 11 is anchored while the opening edge side of the case main body 12 faces upward. An adequate amount of a viscous fluid 31 is poured into the case main body 12.

Next, the rotor 41 is attached to the valve body 51 by mating the free end part 53 to the narrow cross-sectional part of the distribution path 46. The carrying part 52 faces the groove 44, and the center part 43 is inserted in the carrying part 52, using the elasticity of the carrying part 52.

After applying the viscous fluid 31 to the supporting axis 42, the center part 43, the standing part 45, the center part 43 side of the flange 47, and the valve body 51, the rotor 41 is inserted from the supporting axis 42 into the case main body 12.

Once the rotor 41 is inserted-in the case main body 12, the supporting axis 42 is rotatably coupled to the axis supporting part 13, and the center part 43 abuts against the bottom of the case main body 12. In addition, the center part 43 and the carrying part 52 abut against the inner peripheral face of the rotation restriction part 14, and the outer peripheral of the standing part 45 abuts against the inner peripheral face of the case main body 12. The flange 47 abuts against the rotation restriction part 14 and the level part 15.

Moreover, the operation axis part 48 of the rotor 41 is coupled to the O-ring 61. The operation axis part 48 is then inserted in the through hole 23 of the cap 21, while the loop shaped extruding part 24 side faces the lower side. The opening edge of the case main body 12 is sealed by the sealing part 22.

When the O-ring 61 and the cap 21 are attached, the opening edge of the case main body 12 is sealed at the sealing part 22. Leakage of the viscous fluid 31 between the housing and the rotor 41 is prevented by providing a pressure contact among the O-ring 61 and the case main body 12, the loop shaped protrusion part 24, the flange part 47 and the operation axis part 48.

As shown in FIGS. 8 to 10, the one-way damper D can be assembled by creating an air-tight seal in the space between the upper edge of the case main body 12 and the outer edge of the cap 21 by high frequency bonding, and assembly can be completed. When the one-way damper D is assembled, as described, the inside of the housing is divided into two divisions A and B by the rotation restriction part 14 and the standing part 45.

Figure 12:
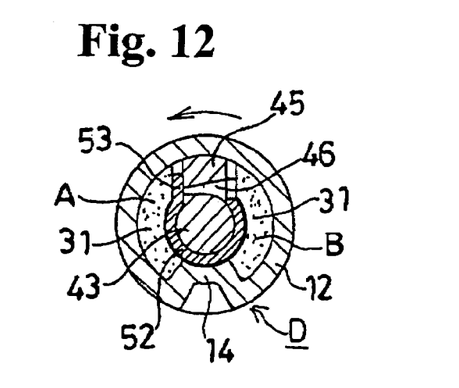
FIG. 12 shows an operation of the one-way damper according to an embodiment of the present invention.
Figure 13:
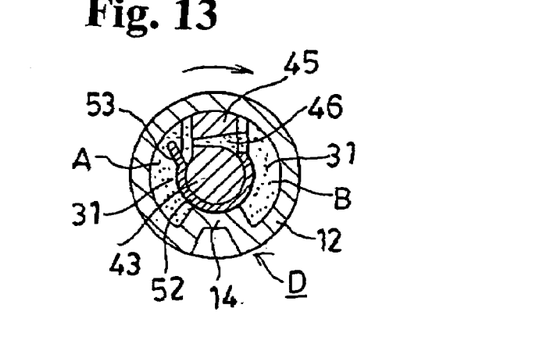
FIG. 13 shows an operation of the one-way damper according to an embodiment of the present invention.

FIGS. 12 and 13 show an operation of the one-way damper according to an embodiment of the present invention.

An operation of the one-way damper according to the embodiment of the present invention will be explained next. In the one-way damper D, the housing is anchored by the first attachment part 16 and/or the second attachment part 18.

As shown in FIG. 12, when the force that causes the operation axis part 48 of the rotor 41 to rotate in the counterclockwise direction occurs, the standing part 45 and the valve body 51 also rotate in the counterclockwise direction, and the silicone oil 31 in the division A is pressurized. Next, the pressurized silicone oil 31 pushes the free end part 53 towards the standing part 45, and seals the distribution path 46. Because the silicone oil 31 in the division A passes through the space (orifice) between the housing and the rotor 41 and flows into the division B, the operation axis part 48 controls the rotation in the counterclockwise direction.

Referring again to FIG. 12, when the force that causes rotation in the clockwise direction occurs, the standing part 45 and the valve body 51 begin to rotate in the clockwise direction. Therefore, the silicone oil 31 in the division B is pressured, and as shown in FIG. 13, the pressured silicone oil 31 passes through the distribution path 46 and pressures the free end part 53, and opens the distribution path 46. Because the silicone oil 31 of the division B passes through the distribution path 46 and flows to the division A, damping does not need that extent for the operation axis part 48 to rotate to the clockwise direction.

As described above, according to the present invention, because the distribution path 46 is provided on the standing part 45 of the rotor 41, and this distribution path 46 is closed and opened by the free end part 53, the space between the housing which functions as an orifice and the rotor becomes narrow and a large torque can be obtained and the certain accuracy of the damping torque can be maintained.

Also, because the rotor 41 is made of polyester, which has elasticity, even when the damping torque of the silicone oil 31 is functioned unevenly to the rotor, the damping torque can be absorbed by the elasticity of the rotor 41. Therefore, the damage and breakage of the rotor 41 can be prevented.

Moreover, because the groove 44 is disposed in the valve body 51, the movement to the axis direction of the valve body can be restricted. And when the thickness of the valve body 51 is the depth of the groove 44, the thickness of the silicone oil 31 becomes even, and the fluctuation of the damping torque disappears, and the damping torque can be regulated.

Further, the cross section of the distribution path 46 is narrowed towards the valve body 51 side, the damping torque can be functioned for the rotation of the rotor 41 to the non-damping direction. Because the rotation regulating part 14 which regulates the rotation of the rotor 41 is provided inside the case main body 12, it can be a one-way damper D having one rotation.

Figure 14:
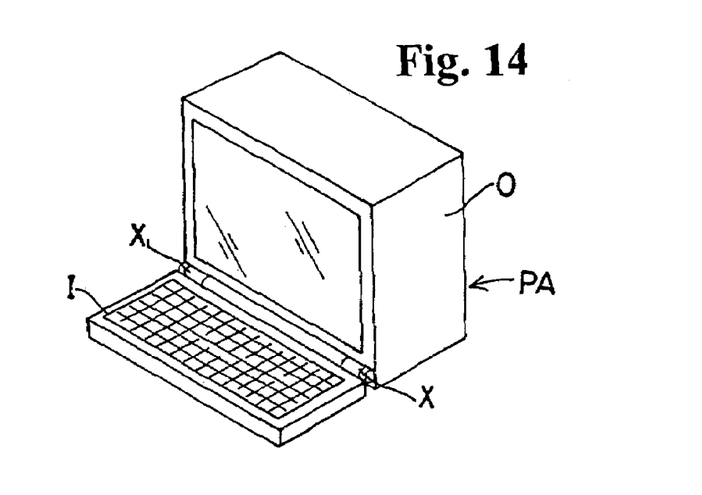
FIG. 14 is a first electronic device that uses the one-way damper according to an embodiment of the present' invention.

FIG. 14 is an explanation drawing for showing one example of an electronic device using a one-way damper according to an embodiment of the invention.

FIG. 14, shows an electronic device PA, such as a personal computer. An inputting part I is attached to a main body O, such that the electronic device PA can stand. The one-way damper described above is used as a rotation axis of a rotation part X. The one-way damper is attached such that the damping torque occurs when the inputting part I falls from the standing position standing along the main body O.

When using the electronic device PA, the lock (not shown) of the lock mechanism, which maintains the inputting part I to the standing position, is unlocked and the upper end of the inputting part I is slightly pulled to forefront, the inputting part I is fallen by its weight. However, this fall of the inputting part I is controlled by this one-way damper.

Figure 15:
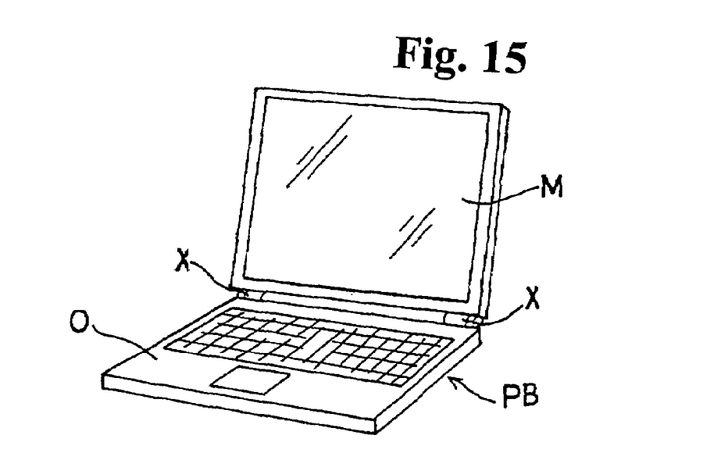
FIG. 15 is a second electronic device that uses the one-way damper according to an embodiment of the present invention.

FIG. 15 shows another electronic device according to an embodiment of the present invention, using the one-way damper of the present invention.

FIG. 15 shows an electronic device PB, such as a personal computer. A monitor part M is attached so as to stand with respect the main body O. The aforementioned one-way damper is used as a rotation axis of a rotation part X. The one-way damper is provided such that a damping torque occurs when the standing monitor M is closed onto the main body O.

When usage of the electronic device PB is completed, the monitor part M is closed onto the main body O by pulling the upper edge of the monitor part M. The closing movement of the monitor M is damped by the one-way damper.

Figure 16:
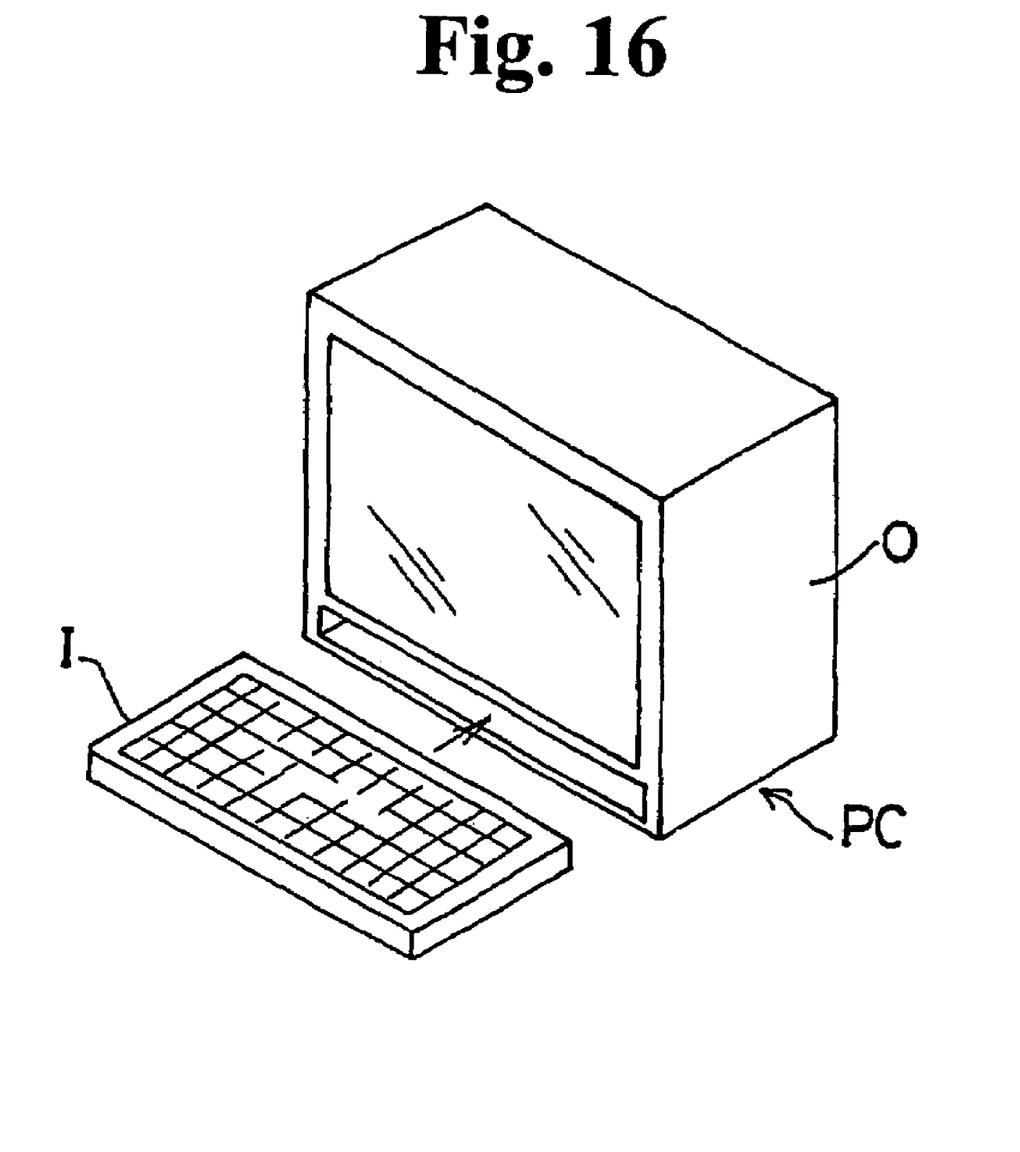
FIG. 16 is a third electronic device that uses the one-way damper according to an embodiment of the present invention.

FIG. 16 shows a still further electronic device according to an embodiment of the present invention using the one-way damper of the present invention.

FIG. 16 shows an electronic device PC, such as a personal computer. An inputting part I is housed such that it may be horizontally taken in and out of the main body O. In addition, the inputting part I stored with respect to the main body O is urged from the main body O by a forcing member (not shown).

Moreover, the one-way damper is attached such that a damping torque occurs when the inputting part I is protruded from the main body O.

In the electronic device PC, when a lock (not shown) of a lock mechanism is unlocked while the inputting part I is stored in the main body O, the inputting part I is ejected from the main body O by the force of the forcing member. For example, when the gear mechanism which gears the rack provided on the conveyer for conveying this inputting part I rotates the operation axis part of the one-way damper, the inputting part I which is ejected from the main body O is damped by the one-way damper.

As described above and as shown in FIGS. 14 to 16, according to the personal computer PA-PC of the present invention, the inputting part I may fall from the standing position as shown in FIG. 14, the monitor part M may fall onto the main body O as shown in FIG. 15, or the inputting part I may be ejected from the main body O by the force of a forcing member. In the present invention, the inputting part I and/or the monitor part M can be damped by the one-way damper. Therefore, damage or breakage of the inputting part I and the monitor part M is prevented.

In the aforementioned embodiments, the example where the rotor 41 is made of a polyester resin is described. When a synthetic resin made of 30 wt % glass is used for the rotor 41, the rotor 41, which receives a high load, can be strengthened. Also, the heat expanding ratio can be minimized. Therefore, damage and breakage of the rotor 41 can be prevented. Also the change in measurement caused by the temperature change can be minimized.

The disclosure of Japanese Patent Application No. 2004-228998 filed on Aug. 5, 2004 is incorporated in the application.

While the invention has been explained with reference to the specific embodiments of the invention, the explanation is illustrative and the invention is limited only by the appended claims.

What is claimed is:

1. A one-way damper comprising:
   a cylindrical housing,
   a viscous fluid contained within the housing,
   a rotor rotatably disposed in the housing and having a columnar center part for forming a rotational center, and a control wall extending radially outwardly from the center part for dividing an inside of the housing, said control wall having a distribution path,
   a valve body having a holding part for holding the center part from outside thereof and a free edge part extending from one side of the holding part for opening and closing said distribution path, said holding part having a shape mostly covering an outer surface of the columnar center part except for the control wall while allowing the free edge part to rotate to closely contact with the center part and slightly away from the center part so that the valve part is rotationally attached to and retained by the columnar center part by itself, and
   a seal member for preventing the viscous fluid from leaking between the housing and the rotor.

2. A one-way damper according to claim 1, wherein said rotor is made of a synthetic resin having elasticity.

3. A one-way damper according to claim 1, wherein said rotor includes a groove in which the valve body is arranged.

4. A one-way damper according to claim 1, wherein said distribution path has a cross-section which gradually becomes narrow towards a side of said valve body.

5. A one-way damper according to claim 1, wherein said rotor includes a rotation restriction part which restricts rotation of said rotor inside of said housing.

6. A one-way damper according to claim 1, wherein said rotor is made of a glass-mixed synthetic resin, and said valve body is made of polyester.

7. An electronic device comprising:
   a main body;
   an inputting part attached to the main body; and
   the one-way damper according to claim 1, said one-way damper forming a rotation axis interposed between the main body and the inputting part for controlling movement of said inputting part when the inputting part is moved from a standing position.

8. An electronic device comprising:
   a main body;
   a monitor part attached to the main body; and
   the one-way damper according to claim 1, said one-way damper forming a rotational axis interposed between the main body and the monitor part for controlling movement of the monitor part for controlling a fall of the monitor part onto the main body.

9. An electronic device comprising:
   a main body;
   an inputting part for removably housing the main body in a horizontal direction; and
   the one-way damper according to claim 1, said one-way damper restricting said inputting part when pushed outwardly.

10. A one-way damper according to claim 1, wherein said cylindrical housing includes a rotation restriction part having a protrusion part protruding inwardly from an inner periphery of the housing.

11. A one-way damper according to claim 10, wherein said protrusion part has an inner periphery contacting an outer periphery of a center part of the rotor and an outer periphery of the holding par.

* * * * *